Aug. 29, 1967  T. C. BAKER ETAL  3,339,138
APPARATUS FOR MEASURING THE RESISTIVITY
OF MOLTEN GLASS
Filed April 2, 1965
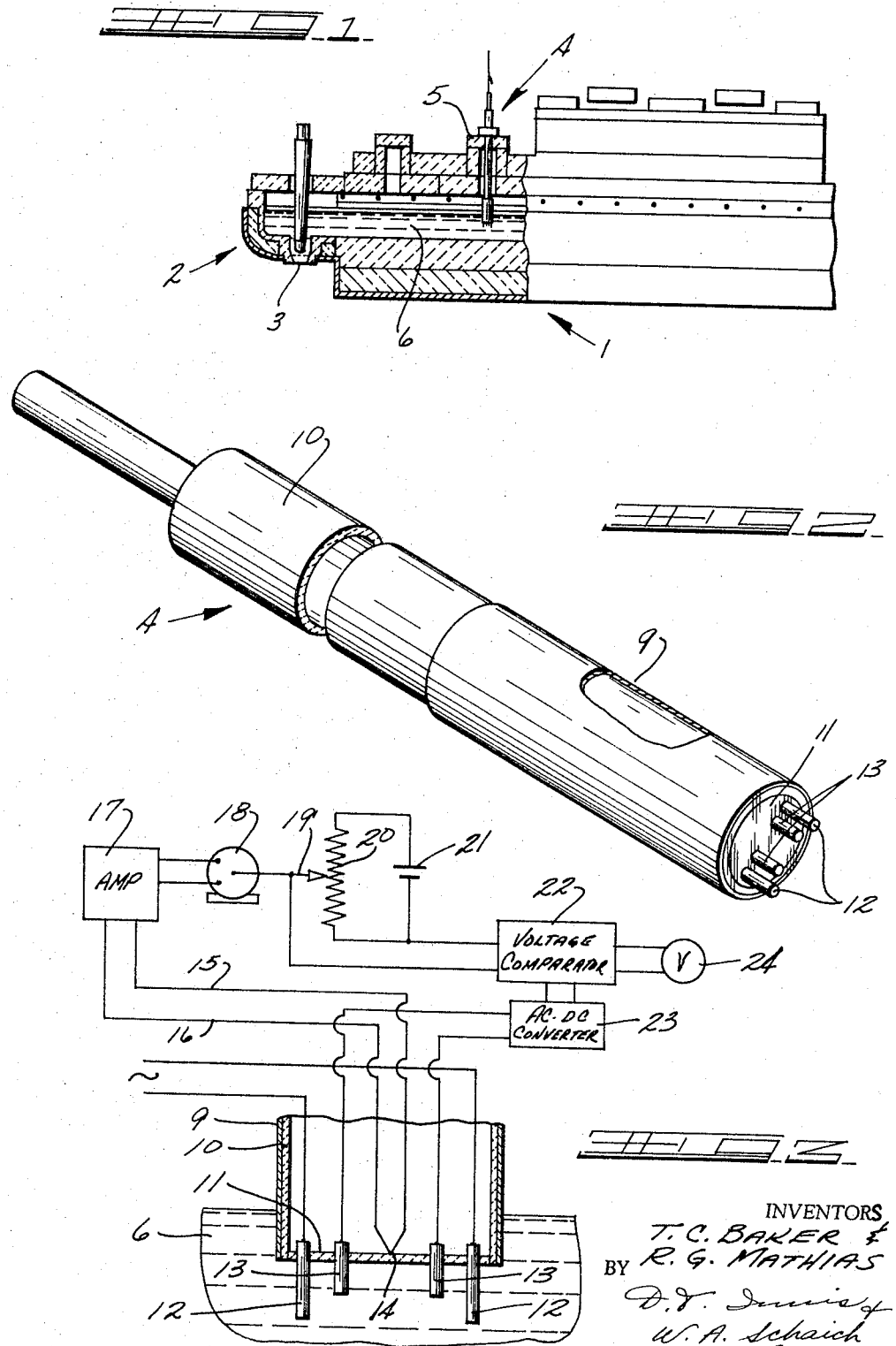
INVENTORS
T. C. BAKER &
BY R. G. MATHIAS
D. T. Dennis &
W. A. Schaich
ATTORNEYS United States Patent Office 3,339,138
Patented Aug. 29, 1967

3,339,138
APPARATUS FOR MEASURING THE RESISTIVITY OF MOLTEN GLASS
Theodore C. Baker, Wayne, and Richard G. Mathias, Toledo, Ohio, assignors to Owens-Illinois, Inc., a corporation of Ohio
Filed Apr. 2, 1965, Ser. No. 445,184
5 Claims. (Cl. 324—64)

ABSTRACT OF THE DISCLOSURE

An electrical resistivity probe for insertion in a body of molten glass wherein the probe takes the form of an elongated, cylindrical member having a pair of current electrodes and a pair of voltage measuring electrodes positioned therebetween and extending from the end of the probe. A thermocouple for sensing the temperature at the immersed end of the probe is also provided so that a temperature compensated resistivity reading may be made.

This is a continuation-in-part of application Ser. No. 113,738, filed May 31, 1961 (now abandoned).

This invention relates to a method and apparatus for measuring the electrical resistivity of molten glass while the glass is flowing.

More particularly, this invention relates to a resistivity sensing probe capable of immersion in a flowing stream of molten glass.

It has been the practice in the past to measure the resistivity of molten glass by taking samples of the glass to a laboratory where it has been necessary to reheat the glass to the temperature at which it was sampled before making the resistivity measurement. Resistivity measuring equipment of the laboratory type necessarily is of a special character and due to the time lag between the sampling and the measurement, the results obtained therefrom were of little use as a process monitoring source.

Applicants have devised a method and apparatus for measuring the resistivity of molten glass while it is in its molten state in a forehearth or melter. The resistivity of the glass is directly related to the composition of the molten glass and the measurement of the resistivity of the molten glass serves as an index of the composition of the glass. Therefore, by providing apparatus which will measure the resistivity during the melting or flowing of the glass to a position where it is utilized to form glass articles, applicants are capable of determining changes in the composition of the glass in time to make corrections in the composition by adding more or less of the ingredients making up the glass batch.

Therefore, it is an object of this invention to provide a method and apparatus for measuring the resistivity of the molten glass which is convenient to use on large quantities of molten glass.

It is a further object of this invention to provide apparatus, in the form of a probe, capable of insertion in any body of molten glass for measuring the resistivity thereof.

A still further object of this invention is to provide a method and apparatus for measuring the resistivity of molten glass and provide a reading of the resistivity which is temperature compensated.

Other and further objects will be apparent from the following description taken in conjunction with the accompanying drawings, wherein:

FIG. 1 is an elevational view, partly in section, with the forward end of a forehearth feeder showing the location of the measuring probe;

FIG. 2 is a perspective view of the measuring probe of the invention; and

FIG. 3 is a cross-sectional view of the measuring probe of FIG. 1 on an enlarged scale showing the electrical connections thereto.

Referring to the drawings, and in particular to FIG. 1, there is shown a conventional forehearth 1 in the form of an elongated channel through which molten glass flows to the forward end 2 where it issues through an orifice 3. It should be readily understood that the glass is continuously flowing through the forehearth in a molten state. A resistivity probe, generally designated 4, is adjustably mounted in the roof 5 of the forehearth and has its lower end immersed in the molten glass stream 6. With the probe 4 positioned as shown in FIG. 1, it will give a continuous output which directly reflects the changes in resistivity of the molten glass flowing in the forehearth.

Referring now to FIGS. 2 and 3, the resistivity probe 4 comprises an elongated, hollow tubular member 10 of heat resistant and erosion resistant material, for example, a high temperature glass flow erosion resistant ceramic. The tubular member 10 has its lower end closed by a disc-like member 11, also formed of a similar heat resistant material.

It has been found that ceramic materials, which are normally used in connection with molten glass, are subject to erosion after relatively short periods of use, for example, in the present instance it was found that a probe would last no more than two or three weeeks under continuous immersion in a stream of molten glass.

With this in view, applicants have found that a cladding 9 of that portion of the probe which is immersed, extends the life of the probe indefinitely. The cladding used is a platinum or platinum-rhodium alloy coated in the manner taught in U.S. Patent No. 3,136,658 issued to R. S. Richards. The area of the probe which is most subject to erosion and corrosion is found to be the area at the interface between molten glass and the hot gases forming the heat blanket on top of the glass. Thus applicants have found that it is necessary to provide the platinum alloy coating on the ceramic member 10 at least in the area of the glass-gas interface when the probe is in position in the forehearth.

Both members 10 and 11 are formed of a material which is electrically non-conductive at the temperatures encountered in its use. Extending through the disc-like member 11 is a first pair of electrode elements 12. The electrode elements 12 are sealed in the disc-like member 11 and extend vertically downward therefrom a given distance. A second pair of electrode elements 13 also extend through the disc-like member 11 and are sealed within the member 11. The elements 13 extend vertically downward from the member 11 a distance less than the elements 12. The elements 12 and 13 lie in a common plane and each pair is equi-spaced from the center of the member 11. A thermocouple 14 is fixed to the top surface of the member 11 at the center thereof and will sense the temperature of the glass in which the probe is immersed. The electrode elements 12 have electrical leads connected thereto which are enclosed within the hollow tubular member 10. The leads connect the electrode elements 12 to a source of constant alternating current.

The second pair of electrode elements 13 has a pair of leads connected to their upper ends and these leads are connected to an A.C. to D.C. converter 23. The thermocouple 14 is connected to operate a wiper arm 19 whose position will be indicative of the temperature sensed by the thermocouple 14.

As can be seen when viewing FIGS. 1 and 3, the tubular member 10, when in use, is immersed in the molten glass 6. The actual length of the tubular member 10 is such that it may be immersed to any desired depth within the bath of molten glass to be investigated.

In the operation of the device, the probe is immersed to a depth in the molten glass at least sufficient to completely immerse all of the electrode elements. The source of alternating current used is of the order of 90 milliamperes and is of a frequency of 750 c.p.s.

The frequency of the alternating current should be in excess of 500 c.p.s. for the reason that frequencies lower than this will produce unwanted polarization at the electrode elements 12. Furthermore, the frequencies should not be too great because use of extreme high frequencies will result in a greater shunting effect due to inter-electrode and lead wire capacitive reactance.

The principle of operation of the system is to pass a constant alternating current through the glass thereby establishing a field within the glass. The field will extend between the two electrode elements 12. A portion of this field is investigated by placing the electrode elements 13 within the field in generally symmetrical relationship to the lines of force set up in the field and the voltage drop across the electrode elements 13 is measured as an indication of resistivity of the glass at its existing temperature. The voltage measuring system is of the type having an extremely high impedance thereby permitting only infinitesimal current flow between the sensing electrodes 13. This in turn minimizes polarization effects due to current flow between the electrodes. The electrode elements 13 are made shorter than elements 12 so that they will be placed in the portion of the field that is most linear and free of the influence of lines of force emanating from the ends of the elements 12.

The temperature of the glass is sensed by the thermocouple 14. The voltage across the electrode elements 13 will be equal to the constant current flow multiplied by the resistance of the viewed volume of glass. Expressed mathematically:

$$E_s = I_c R$$

$$R = \rho \frac{l}{A}$$

Therefore:

$$E_s = I_c \rho \frac{l}{A}$$

Where:

$E_s$ = EMF across the voltage probes
$I$ = constant current
$\rho$ = resistivity of the glass
$l$ = length of investigated sample
$A$ = area of investigated sample The factor $l/A$ is a constant determined by the geometry of the electrode elements 13 and their spacing within the molten glass, and will remain a constant during successive measurements. The current ($I_c$) is a constant and, therefore, these two constants may be grouped together into a single constant ($c$) with the following results that:

$E = c\rho$, therefore, the voltage is proportional to ($\rho$) resistivity.

With particular reference to FIG. 3, the small current generated by the thermocouple 14 is connected by leads 15 and 16 to an amplifier 17. The output of the amplifier is connected to a reversible motor 18 whose output is connected to mechanically drive the wiper arm 19, it being understood that the position of the wiper will directly reflect the actual temperature sensed by the thermocouple 14. With this in view, the wiper 19 may be operated in conjunction with a temperature scale positioned in back thereof. However, the wiper 19 serves as a variable tap for a non-linearly wound resistance element 20. The resistance element 20 is connected to a source of D.C. current, for example, the battery 21. The voltage drop across one end of the resistor and the wiper 19 is connected to a voltage comparator 22 where its voltage is compared with the voltage derived from the electrodes 13. Inasmuch as the voltage appearing across the electrodes 13 is derived from an A.C. field, it will be necessary to connect the electrodes 13 to an A.C. to D.C. converter 23. The output of the comparator 22 will provide a signal which is fed to a voltmeter 24 which will provide an indication of the resistivity of the molten glass, compensated for temperature variations as sensed by the thermocouple 14. The voltmeter 24 may be calibrated directly in resistivity units.

Thus it can be seen that applicants provide an instrument which will give an indication of the actual resistivity of the molten glass irrespective of temperature transients which would enter into an actual resistivity measurement.

Various modifications may be resorted to within the spirit and scope of the appended claims.

We claim:

1. A molten glass resistivity sensing device, comprising an elongated, hollow tubular member of heat resistant material, a disc-like member of heat resistant material closing one end of said tubular member, a first pair of electrode elements extending through and sealed to said disc-like member in spaced apart relationship, a second pair of electrode elements extending through and sealed to said disc-like member, said electrode elements all lying in a common plane with the second pair of elements being between said first pair of elements, and a thermocouple fixed to the center of said disc-like member within the hollow, tubular member.

2. The probe of claim 1, wherein the first pair of elements are at equal distances from the center of the said disc-like member and said second pair of elements are at equal but less distance from the center of said disc-like member.

3. A resistivity sensing probe, comprising an elongated, hollow member of heat and erosion resistant ceramic material, a flat member of heat and erosion resistant material closing one end of said elongated hollow member, a first pair of electrodes extending through and sealed to said flat member, said electrodes being spaced apart a predetermined distance, a second pair of electrodes extending through and sealed to said flat member, said second pair of electrodes lying in a plane common to said first pair of electrodes and positioned therebetween, a platinum-rhodium alloy coating bonded to the external surface of said elongated, hollow member and extending from the closed end thereof to a point above the normal immersion depth to which the probe will be subjected when positioned to measure the resistivity of molten glass in a flowing channel of glass.

4. The probe as defined in claim 3, wherein the first pair of electrodes extend below the surface of said flat member a greater distance than said second electrodes and said second electrodes are symmetrically positioned with respect to said first electrodes.

5. The probe as defined in claim 3, further including a thermocouple fixed to the upper surface of said flat member intermediate said electrodes, means connected to said thermocouple for deriving a voltage proportional to the temperature, a source of current connected to said first pair of electrodes, means connected to said second pair of electrodes for deriving a voltage proportional to the electrical resistivity of the molten glass and means connected to said voltage deriving means for comparing said voltages.

(References on following page)

References Cited

UNITED STATES PATENTS

| | | | |
|---|---|---|---|
| 1,399,200 | 12/1921 | Edelman. | |
| 2,004,569 | 6/1935 | Davis | 324—64 |
| 2,476,943 | 7/1949 | Brady | 324—64 |
| 2,684,592 | 7/1954 | Hadady. | |
| 2,871,445 | 1/1959 | Carter et al. | 324—64 X |
| 2,871,446 | 1/1959 | Wann | 324—64 |
| 2,914,725 | 11/1959 | Carter et al. | 324—30 |
| 2,977,797 | 4/1961 | Hoffmann et al. | 73—304 |
| 2,985,825 | 5/1961 | Whittier | 324—61 |
| 2,988,690 | 6/1961 | Love et al. | 324—64 X |

OTHER REFERENCES

Thornton: "Measurement of Thickness of Metal Walls," Proceedings: The Institution of Mechanical Engineers, October-December, 1938, 140: 349–359.

RUDOLPH V. ROLINEC, *Primary Examiner.*

WALTER L. CARLSON, *Examiner.*

E. E. KUBASIEWICZ, *Assistant Examiner.*